P. ALLARD.
TICKET HOLDER.
APPLICATION FILED SEPT. 10, 1920.

1,401,120.

Patented Dec. 27, 1921.

Inventor
P. Allard
By
Attorney

UNITED STATES PATENT OFFICE.

PIERRE ALLARD, OF MAISONNEUVE, QUEBEC, CANADA.

TICKET-HOLDER.

1,401,120.   Specification of Letters Patent.   Patented Dec. 27, 1921.

Application filed September 10, 1920. Serial No. 409,326.

*To all whom it may concern:*

Be it known that I, PIERRE ALLARD, a British subject, residing at #675 Notre Dame street, in the city of Maisonneuve, in the Province of Quebec, in the Dominion of Canada, have invented certain new and useful Improvements in Ticket-Holders; and I do hereby declare that the following is a full, clear, and exact description of the same.

The present invention relates to improvements in a ticket holder, described in Canadian Patent #180014 dated the 30th of October, 1917, and the corresponding United States Patent #1294997 dated the 18th of February, 1919.

The main object of the invention is to provide improved means for resiliently supporting the movable plate on which the tickets are placed.

A further object of the invention is to provide a cheaper and more simple way of hinging the cover on the casing.

Another object of the invention is to devise a novel manner of ejecting the tickets, in a uniform and more practical way.

In order to better understand the invention, reference should be had to the accompanying drawings in which:—

Like numerals of reference indicate corresponding parts in each figure.

Figure 1:
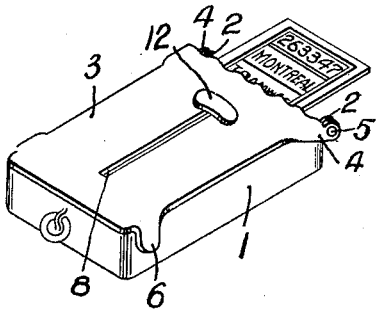
Figure 1 is a perspective view of the invention, illustrating a ticket partly shoved out.
Figure 2:
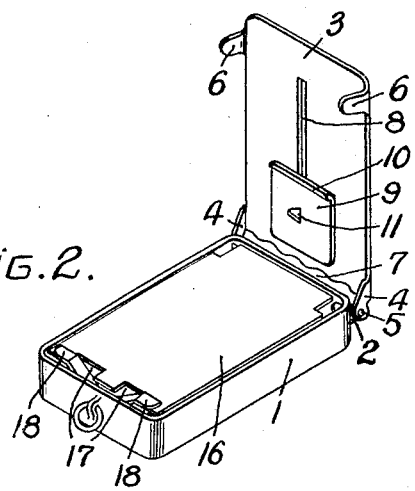
Fig. 2 is a perspective view of the invention, the cover being illustrated in its open position.
Figure 3:
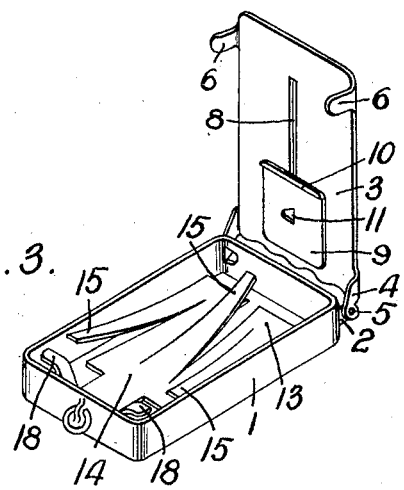
Fig. 3 is a perspective view of the holder when open, the ticket supporting plate having been removed, to disclose the particular type of resilient supports used.

Referring to the drawings, 1 indicates the holder or casing having an open side, and at one end thereof provided with pressed out or outwardly projecting lugs 2, said open side being closed by the cover plate 3. The cover 3 is also provided with lugs 4 adapted to project adjacent said lugs 2, and 5 is a pin pivotally securing said lugs together. Each side of said cover 3 is provided with downward resilient lugs 6 adapted to clamp the sides of said casing 1, thus securely closing said cover over said casing. One end of said cover 3 is preferably shorter than the casing to provide an opening 7 through which the tickets are ejected. Intermediate of said cover is provided a longitudinal slot 8, and 9 is a plate located inside said cover, having a flange 10 at one end thereof, said plate being slidable within said casing and is mounted on a pin 11 which projects through said slot 8 which is terminated by a head 12. It will readily be seen that by pushing on said head 12, the plate 9 will be moved, and thus engage by means of its flange 10 the tickets located below. The tickets will, therefore, be carried, one by one, because the flange 10 is just thick enough to engage one ticket at a time, and the opening 7 large enough to allow only one ticket through.

In the bottom of said casing 1, is suitably secured a resilient element 13, consisting of a central member 14 having preferably three obliquely projecting resilient members 15 on which is adapted to rest the ticket supporting plate 16, said plate being preferably soldered at one end to one of said resilient members 15 and provided at its other end with slots 17 which are adapted to allow sufficient space for the lugs 18, forming an integral part of the resilient element 13, to pass therethrough and limit the upward movement of said plate 16.

What I claim as my invention is:—

1. In a ticket holder of the character described in combination with the casing and cover; a ticket supporting plate; resilient means supporting said plate, said means consisting in a plurality of obliquely projecting flat springs, one of said springs being soldered to one end of said plate; and means integral with said resilient means adapted to engage said ticket supporting plate whereby the upward movement of said ticket supporting plate will be limited.

2. In a ticket holder of the character described in combination with a casing and cover therefor; a ticket supporting plate; a resilient element below said plate suitably secured to the bottom of said casing, said element consisting of a plate having projecting therefrom, in opposite directions, a plurality of resilient members, one of said resilient members being soldered to said plate at one end thereof; lugs projecting from said resilient element, and integral therewith, said lugs being adapted to engage said plate to limit its upward movement.

Signed at Montreal, Quebec, Canada, this tenth day of August, 1920.

PIERRE ALLARD.

Witnesses:
C. PATENAUDE,
G. BEAUDOIN.